US012528937B2

(12) United States Patent
Shikata et al.

(10) Patent No.: US 12,528,937 B2
(45) Date of Patent: Jan. 20, 2026

(54) POLYETHYLENE POWDER AND SHAPED BODY THEREOF

(71) Applicant: ASAHI KASEI KABUSHIKI KAISHA, Tokyo (JP)

(72) Inventors: Kazuya Shikata, Tokyo (JP); Masahide Uomi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 647 days.

(21) Appl. No.: 17/923,255

(22) PCT Filed: May 20, 2021

(86) PCT No.: PCT/JP2021/019247
§ 371 (c)(1),
(2) Date: Nov. 4, 2022

(87) PCT Pub. No.: WO2021/241411
PCT Pub. Date: Dec. 2, 2021

(65) Prior Publication Data
US 2023/0279203 A1  Sep. 7, 2023

(30) Foreign Application Priority Data
May 29, 2020 (JP) .................... 2020-094628

(51) Int. Cl.
*C08L 23/06* (2006.01)
*H01M 10/0525* (2010.01)
*H01M 50/417* (2021.01)

(52) U.S. Cl.
CPC ......... *C08L 23/06* (2013.01); *H01M 10/0525* (2013.01); *H01M 50/417* (2021.01); *C08L 2203/20* (2013.01)

(58) Field of Classification Search
CPC ........................ C08L 23/06; C08L 2203/20; H01M 10/0525; H01M 50/417; H01M 50/409; C08F 10/02; C08F 110/02; Y02E 60/10
See application file for complete search history.

(56) References Cited

U.S. PATENT DOCUMENTS

| 2009/0163679 A1 | 6/2009 | Do Nascimento et al. |
| 2015/0249242 A1 | 9/2015 | Kamo et al. |
| 2016/0340449 A1 | 11/2016 | Hjertberg et al. |
| 2017/0125763 A1 | 5/2017 | Inatomi et al. |
| 2019/0359740 A1 | 11/2019 | Tanaka |
| 2021/0017363 A1 | 1/2021 | Tsujimoto |
| 2021/0032446 A1 | 2/2021 | Tanaka |

FOREIGN PATENT DOCUMENTS

| CN | 105658684 A | 6/2016 |
| CN | 109422918 A | 3/2019 |
| EP | 2907829 A1 | 8/2015 |
| EP | 4050043 A1 | 8/2022 |
| JP | S61-287908 A | 12/1986 |
| JP | S63-117019 A | 5/1988 |
| JP | H02-021559 A | 1/1990 |
| JP | 2000-230025 A | 8/2000 |
| JP | 2002-187996 A | 7/2002 |
| JP | 2010-235926 A | 10/2010 |
| JP | 2011-116981 A | 6/2011 |
| JP | 2014-133873 A | 7/2014 |
| JP | 5685056 B2 | 3/2015 |
| JP | 2015-180716 A | 10/2015 |
| JP | 2015-193816 A | 11/2015 |
| JP | 2019-048967 A | 3/2019 |
| WO | 2018/143191 A1 | 8/2018 |

(Continued)

OTHER PUBLICATIONS

Supplementary European Search Report issued in European Patent Application No. 21813318.9 dated Oct. 24, 2023.

(Continued)

*Primary Examiner* — Catherine S Branch
*Assistant Examiner* — Olga Lucia Donahue
(74) *Attorney, Agent, or Firm* — Morgan, Lewis & Bockius LLP

(57) ABSTRACT

Polyethylene powder satisfying (Requirements 1 and 2):

(Requirement 1)

a viscosity change rate of a gel under <Conditions for Preparing Gel> is −0.8 to 0.0 Pas/° C. under <Conditions for Measurement of Viscosity Change Rate>;

<Conditions for Preparing Gel>

28 g liquid paraffin of 450 to less than 550 g/mol, 12 g polyethylene powder, and 0.4 g tetrakis[methylene (3,5-di-t-butyl-4-hydroxy-hydrocinnamate)]methane are kneaded at 200° C. and 50 rpm for 10 min using Labo Plastomill to obtain a gel;

<Conditions for Measurement of Viscosity Change Rate> viscosity (Pas) is measured at a piston rate of 10 mm/min (shear rate of 266 s$^{-1}$) at 200° C. and 230° C. in accordance with a flow characteristics test using a capillary die prescribed in JIS K7199, and a viscosity change rate (Pas/° C.):

$$\text{viscosity change rate} = \frac{\eta(266, 230) - \eta(266, 200)}{30} \quad (1)$$

wherein η(A,B) represents a viscosity found at shear rate of A s$^{-1}$ and temperature of (Requirement 2)

intrinsic viscosity (IV) is 1.5 to less than 18.0 dL/g.

20 Claims, No Drawings

(56) References Cited

FOREIGN PATENT DOCUMENTS

| WO | 2019/187727 A1 | 10/2019 |
| WO | 2019/207991 A1 | 10/2019 |
| WO | 2020/189443 A1 | 9/2020 |
| WO | 2021/079840 A1 | 4/2021 |

OTHER PUBLICATIONS

International Preliminary Report on Patentability and Written Opinion issued in corresponding International Patent Application No. PCT/JP2021/019247 dated Dec. 8, 2022.

Xie et al., "Polymer Physics," National Defense Industry Press: Beijing, pp. 98-99 (1989).

International Search Report (with partial translation) and Written Opinion dated Jul. 20, 2021, for corresponding International Patent Application No. PCT/JP2021/019247.

POLYETHYLENE POWDER AND SHAPED BODY THEREOF

TECHNICAL FIELD

The present invention relates to a polyethylene powder and a shaped body thereof.

BACKGROUND ART

Polyethylene has been conventionally used as a material for a wide variety of applications such as films, sheets, microporous membranes, fibers, foams, and pipes, because polyethylene is easy to melt-process, and shaped bodies of polyethylene have high mechanical strength and are also excellent in chemical resistance, rigidity, and the like.

Particularly, ultrahigh molecular weight polyethylene has higher mechanical strength and is excellent in sliding properties and wear resistance and further, also excellent in chemical stability and long-term reliability and therefore has high practical applicability.

Examples of general methods for shaping ultrahigh molecular weight polyethylene include a wet extrusion method. The wet extrusion method is a method involving dissolving an ultrahigh molecular weight polyethylene powder in a solvent to obtain a gel whose viscosity is adjusted low, performing extrusion using this gel, and then removing the solvent to obtain a shaped body, and utilized as a method for shaping a fiber or a microporous membrane (see, for example, Patent Document 1).

LIST OF PRIOR ART DOCUMENTS

Patent Document

Patent Document 1: Japanese Patent Laid-Open No. 2-21559

SUMMARY OF INVENTION

Problems to be Solved by Invention

In the wet extrusion method, it is necessary to suitably control the viscosity of the gel in order to enhance the productivity of the shaped body. In the extrusion of the wet extrusion method, it is possible to perform smooth shaping by suitably controlling the viscosity of the solution (gel) obtained by dissolving ultrahigh molecular weight polyethylene in the solvent, and the control of the viscosity of the gel at the time is mainly performed by adjusting the extrusion temperature and adjusting the proportion of ultrahigh molecular weight polyethylene in the gel.

The proportion of ultrahigh molecular weight polyethylene in the gel is preferably as high as possible because decreasing this leads to decreasing the yield of the shaped body. On the other hand, when the proportion of ultrahigh molecular weight polyethylene in the gel is increased, the viscosity of the gel increases. For the extrusion temperature, generally, as the temperature becomes higher, the viscosity of the gel tends to decrease. Therefore, in view of fabricability, the extrusion temperature is set as high as possible. However, when the extrusion temperature is increased, slightly crosslinked products and scorches tend to occur in the extruder, which causes the problems of the occurrence of the thread breakage of a fiber, or membrane defects in a microporous membrane, and the occurrence of pressure increase of the extruder due to the clogging of the extruder screen. Therefore, there is a need for ultrahigh molecular weight polyethylene that enables decrease in the viscosity of a gel and also increase in the proportion of the ultrahigh molecular weight polyethylene in the gel. However, ultrahigh molecular weight polyethylene that can satisfy this is not obtained unfortunately under the present circumstances.

Another problem is the dimensional stability of the shaped body.

In the shaping of a fiber or a microporous membrane, the step of stretching a shaped body is carried out for the purpose of imparting strength. Stress remains in the shaped body at the time so that the shaped body shrinks over time, and practically sufficient dimensional stability is not obtained unfortunately.

For such the problem of dimensional stability, regarding a fiber, Japanese Patent Laid-Open No. 2019-90136, for example, discloses a fiber having improved creep resistance and made of ultrahigh molecular weight polyethylene having a predetermined primary structure and predetermined thermal properties.

Regarding a microporous membrane, dimensional stability can be evaluated by the physical properties, specifically, a thermal shrinkage rate, and for the thermal shrinkage rate, Japanese Patent Laid-Open No. 2011-233542, for example, discloses a microporous membrane whose thermal shrinkage rate is reduced by adjusting metal content.

However, a problem of the techniques disclosed in the conventionally known literature is that they cannot simultaneously solve the problems of the productivity of the shaped body and the reduction of the viscosity of the gel as described above.

In the case of a microporous membrane, it can also be said that small slack in the membrane due to shrinkage over time at normal temperature means high dimensional stability. However, regarding such improvement of dimensional stability, sufficient studies in terms of the starting material are not made in conventional techniques, and a problem is that a microporous membrane having sufficient dimensional stability is not yet obtained.

Accordingly, in view of the problems, it is an object of the present invention to provide a polyethylene powder that enables few membrane defects in a shaped body, small pressure increase of an extruder, a small thermal shrinkage rate of the shaped body, and reduced slack over time in the shaped body.

Means for Solving Problems

As a result of diligent studies to solve the problems, the present inventor has found that a polyethylene powder satisfying predetermined physical properties defined by melt viscoelastic measurement can solve the problems, and has completed the present invention.

Specifically, the present invention is as follows.

[1]

A polyethylene powder satisfying the following (Requirement 1) and (Requirement 2):
(Requirement 1): a viscosity change rate of a gel obtained by the following <Conditions for Preparing Gel> is −0.8 Pas/° C. or more and 0.0 Pas/° C. or less under the following <Conditions for Measurement of Viscosity Change Rate>:
<Conditions for Preparing Gel>
: 28 g of a liquid paraffin having an average molecular weight of 450 g/mol or more and less than 550 g/mol, 12 g of the polyethylene powder, and 0.4 g of tetrakis[methylene (3,5-di-t-butyl-4-hydroxy-hydrocinnamate)]methane are kneaded at a set temperature of 200° C. and a rotation rate of 50 rpm for 10 min using Labo Plastomill (manufactured by Toyo Seiki Seisaku-sho, Ltd., model 4C150, mixer model R-60) to obtain a gel;

<Conditions for Measurement of Viscosity Change Rate>
: viscosity (Pas) is measured at a piston rate of 10 mm/min (a shear rate of 266 s$^{-1}$) at set temperatures of 200° C. and 230° C. in accordance with a flow characteristics test using a capillary die prescribed in JIS K7199, using a capillary die having a capillary diameter of 0.77 mm, a length of 50.80 mm, and an inlet angle of 90°, and a viscosity change rate (Pas/° C.) is obtained by the following formula (1):

$$\text{viscosity change rate} = \frac{\eta(266, 230) - \eta(266, 200)}{30} \quad (1)$$

wherein η(A,B) represents a viscosity found under conditions of a shear rate of A s$^{-1}$ and a temperature of B° C.;

(Requirement 2): intrinsic viscosity (IV) is 1.5 dL/g or more and less than 18.0 dL/g.

[2]
The polyethylene powder according to [1], wherein a viscosity of the gel at a shear rate of 266 s$^{-1}$ and a set temperature of 200° C., η(266,200), is 100 Pas or more and 300 Pas or less.

[3]
The polyethylene powder according to [1] or [2], wherein when a viscosity of the gel at a shear rate of 11 s$^{-1}$ and a set temperature of 200° C. and a viscosity of the gel at a shear rate of 533 s$^{-1}$ and a set temperature of 200° C. are measured under the <Conditions for Measurement of Viscosity Change Rate> for the gel obtained by the <Conditions for Preparing Gel>, log(η(11,200)/η(533,200)) is 1.00 or more and 1.80 or less.

[4]
The polyethylene powder according to any one of [1] to [3], wherein the polyethylene powder is an ethylene homopolymer.

[5]
The polyethylene powder according to any one of [1] to [4], wherein isothermal crystallization time at 125° C. obtained by the following <Conditions for Measurement of Isothermal Crystallization Time> is less than 7.0 min, <Conditions for Measurement of Isothermal Crystallization Time>
step A1: the polyethylene powder is maintained at 50° C. for 1 min, and then temperature is increased to 180° C. at a temperature increase rate of 10° C./min
step A2: the polyethylene powder is maintained at 180° C. for 5 min, and then the temperature is decreased to 125° C. at a temperature decrease rate of 80° C./min
step A3: the polyethylene powder is maintained at 125° C., and a time when an exothermic peak top due to crystallization is obtained is taken as isothermal crystallization time, provided that a point in time when the temperature reaches 125° C. is a starting point (0 min).

[6]
A shaped body of the polyethylene powder according to any one of [1] to [5].

[7]
The shaped body according to [6], wherein the shaped body is a separator for a battery.

[8]
The shaped body according to [6], wherein the shaped body is a separator for a lithium ion secondary battery.

Advantages of Invention

According to the present invention, it is possible to provide a polyethylene powder that enables few membrane defects in a shaped body, small pressure increase of an extruder, a small thermal shrinkage rate of the shaped body, and reduced slack over time in the shaped body.

MODE FOR CARRYING OUT INVENTION

A mode for carrying out the present invention (hereinafter also referred to as the "present embodiment") will be described in detail below.

The present embodiment below is an illustration for describing the present invention and is not intended to limit the present invention to the following contents. Various modifications can be made to the present invention without departing from the spirit thereof.

[Polyethylene Powder]
A polyethylene powder of the present embodiment satisfies the following (Requirement 1) and (Requirement 2):
(Requirement 1): a viscosity change rate of a gel obtained by the following <Conditions for Preparing Gel> is −0.8 Pas/° C. or more and 0.0 Pas/° C. or less under the following <Conditions for Measurement of Viscosity Change Rate>:

<Conditions for Preparing Gel>
: 28 g of a liquid paraffin having an average molecular weight of 450 g/mol or more and less than 550 g/mol, 12 g of the polyethylene powder, and 0.4 g of tetrakis [methylene(3,5-di-t-butyl-4-hydroxy-hydrocinnamate)]methane are kneaded at a set temperature of 200° C. and a rotation rate of 50 rpm for 10 min using Labo Plastomill (manufactured by Toyo Seiki Seisaku-sho, Ltd., model 4C150, mixer model R-60) to obtain a gel;

<Conditions for Measurement of Viscosity Change Rate>
: viscosity (Pas) is measured at a piston rate of 10 mm/min (a shear rate of 266 s$^{-1}$) at set temperatures of 200° C. and 230° C. in accordance with a flow characteristics test using a capillary die prescribed in JIS K7199, using a capillary die having a capillary diameter of 0.77 mm, a length of 50.80 mm, and an inlet angle of 90°, and a viscosity change rate (Pas/° C.) is obtained by the following formula (1):

$$\text{viscosity change rate} = \frac{\eta(266, 230) - \eta(266, 200)}{30} \quad (1)$$

wherein η(A,B) represents the viscosity (Pas) of the gel found under the conditions of a shear rate of A s$^{-1}$ and a temperature of B° C.

That is, η(266,230) represents the viscosity (Pas) of the gel found under the conditions of a shear rate of 266 s$^{-1}$ and a temperature of 230° C., and η(266,200) represents the viscosity (Pas) of the gel found under the conditions of a shear rate of 266 s$^{-1}$ and a temperature of 200° C.

(Requirement 2): intrinsic viscosity (IV) is 1.5 (dL/g) or more and less than 18.0 (dL/g).

Since the polyethylene powder of the present embodiment has the above features, the following (i) to (iv) effects are obtained.

(i) For the polyethylene powder of the present embodiment, the pressure increase of an extruder during extrusion is small.
(ii) A shaped body, for example, a microporous membrane, shaped by using the polyethylene powder of the present embodiment has few defects such as slightly crosslinked products, scorches, dirt, and pinholes and is preferred as a separator for a battery.
(iii) A shaped body, for example, a microporous membrane, shaped by using the polyethylene powder of the present embodiment has reduced slack and is excellent in appearance and preferred as a separator for a battery.
(iv) A shaped body, for example, a microporous membrane, shaped by using the polyethylene powder of the present embodiment has a low thermal shrinkage rate and is preferred as a separator for a battery.

The features of the polyethylene powder of the present embodiment will be described below.
(Polyethylene)

The polyethylene powder of the present embodiment is made of an ethylene polymer.

In the ethylene polymer, 99.5 mol % or more of the constituent units are preferably ethylene units, more preferably 99.8 mol % or more of the constituent units are ethylene units, and further preferably 100 mol % of the constituent units are ethylene units, that is, the ethylene polymer is an ethylene homopolymer.

When the polyethylene powder of the present embodiment is an ethylene homopolymer, the strength of a shaped body tends to improve.

The ethylene polymer constituting the polyethylene powder of the present embodiment may be a copolymer that is obtained by introducing a branch by adding a very small amount of a copolymerizable component such as an α-olefin for the purpose of improving the polymerization rate and improving the fabricability during membrane formation.

Examples of the copolymerizable component when the ethylene polymer is the copolymer include, but are not limited to, α-olefins and vinyl compounds.

Examples of the α-olefins include, but are not limited to, α-olefins having 3 to 20 carbon atoms, specifically, propylene, 1-butene, 4-methyl-1-pentene, 1-hexene, 1-octene, 1-nonene, 1-decene, 1-undecene, 1-dodecene, 1-tridecene, and 1-tetradecene.

Examples of the vinyl compounds include, but are not limited to, vinylcyclohexane, styrene, and derivatives thereof.

A nonconjugated polyene such as 1,5-hexadiene or 1,7-octadiene can also be used as another comonomer, as needed.

Only one copolymerizable component may be used alone, or two or more copolymerizable components may be used in combination.

The amount of another comonomer in the copolymer when the ethylene polymer constituting the polyethylene powder of the present embodiment is the copolymer can be confirmed by an NMR method or the like.
(Polyethylene Powder)

The polyethylene powder of the present embodiment is in the form of a powder, and its average particle diameter is not particularly limited but is preferably 500 μm or less, more preferably 300 μm or less, and further preferably 150 μm or less. The average particle diameter of the polyethylene powder is preferably 5 μm or more, more preferably 10 μm or more.

When the average particle diameter of the polyethylene powder of the present embodiment is 500 μm or less, the solubility of the polyethylene powder in a solvent improves more, and the undissolved residue that impairs the performance and appearance of the shaped body can be reduced. When the average particle diameter of the polyethylene powder is 5 μm or more, the scattering of the powder is suppressed to thereby improve the handling properties more. In addition, when the powder having an average particle diameter of 5 μm or more is added to a solvent, the formation of lumps is suppressed, which results in that the formation of a uniform slurry tends to be easier.

The average particle diameter here is the particle diameter at which the cumulative mass is 50%, that is, the median diameter.
(Density of Polyethylene Powder)

The density of the polyethylene powder of the present embodiment is not particularly limited but is preferably 910 kg/m$^3$ or more and 980 kg/m$^3$ or less, more preferably 915 kg/m$^3$ or more and 970 kg/m$^3$ or less, and further preferably 920 kg/m$^3$ or more and 965 kg/m$^3$ or less.

The density of the polyethylene powder is the true density of the polymer.

When the density of the polyethylene powder is 910 kg/m$^3$ or more and 980 kg/m$^3$ or less, a shaped body containing the polyethylene powder of the present embodiment tends to have excellent strength.
(Viscosity Change Rate)

For the polyethylene powder of the present embodiment, the viscosity change rate of a gel obtained under <Conditions for Preparing Gel> is −0.8 Pas/° C. or more and 0.0 Pas/° C. or less, preferably −0.5 Pas/° C. or more and 0.0 Pas/° C. or less, and more preferably −0.2 Pas/° C. or more and 0.0 Pas/° C. or less, under <Conditions for Measurement of Viscosity Change Rate>.

The polyethylene powder of the present embodiment has high molecular weight compared with general-purpose polyethylene used for film shaping, blow molding, and the like and therefore has the entanglement of molecules not only in a state of polyethylene alone but also in a state of a gel obtained under <Conditions for Preparing Gel>. It is known that for such polyethylene having the entanglement of molecules, the temperature dependence of viscosity decreases extremely in a particular temperature (or shear rate) region (rubbery plateau region). The viscosity change rate measured under <Conditions for Measurement of Viscosity Change Rate> means the temperature dependence of viscosity in this rubbery plateau region, and the viscosity change rate thus obtained represents the extent of the entanglement of molecules.

The polyethylene powder of the present embodiment is characterized in that a gel obtained under <Conditions for Preparing Gel> has a viscosity change rate in a particular range, and this is due to the fact that the polyethylene powder of the present embodiment has molecular entanglement in a particular range, that is, the entanglement of molecules in a suitable range.

When the viscosity change rate of a gel obtained under <Conditions for Preparing Gel> by using the polyethylene powder of the present embodiment is −0.8 Pas/° C. or more and 0.0 Pas/° C. or less, the following effects are obtained.

Generally, when polyethylene is made into a separator for a battery by a wet extrusion method, extrusion is often carried out under the conditions of a large content of polyethylene in a gel and a higher set temperature, for the purpose of adjusting the viscosity of the gel in order to ensure good fabricability (membrane formability), and for the purpose of obtaining high productivity (yield). However, when extrusion is performed under high temperature conditions, problems tend to arise, including the occurrence of defects due to slightly crosslinked products and scorches in the shaped body, and excessive pressure increase of the extruder.

On the other hand, a gel obtained by using the polyethylene powder of the present embodiment has a low viscosity change rate. Therefore, a high proportion of polyethylene can be maintained even at relatively low temperature, and the occurrence of defects in a shaped body, and the pressure increase of an extruder can be reduced with high productivity (yield) ensured.

In addition, the gel obtained by using the polyethylene powder of the present embodiment has molecular entanglement in a particular range as described above. The production of a separator for a battery includes two characteristic steps, specifically, stretching a membrane and heat setting the membrane. Polyethylene molecules are stretched and oriented in these steps, and then the orientation is relaxed. By suitably controlling these orientation and relaxation, the balance of physical properties such as the strength and thermal shrinkage of the membrane is regulated. The extent of the entanglement of molecules greatly affects these orientation and relaxation. The gel obtained by using the polyethylene powder of the present embodiment has the extent of entanglement in a suitable range; therefore the thermal shrinkage can be reduced, and the occurrence of slack over time can also be suppressed.

The viscosity change rate of the gel obtained by using the polyethylene powder of the present embodiment calculated by the formula (1) can be controlled by giving a suitable branched structure to polyethylene.

Specifically, when the primary structure of polyethylene such as the length of the side chains of polyethylene and the intervals between the side chains is controlled to give a suitable branched structure to polyethylene, the confinement of molecules occurs due to the branching and entanglement of polyethylene molecules, and therefore the viscosity change rate tends to decrease.

Examples of the method for giving a suitable branched structure to polyethylene include a method involving polymerization in an environment in which the production and coordination of a macromonomer occur easily. Specific examples include performing polymerization using a catalyst having active site density in a saturated state, setting polymerization temperature at 80° C. or more, setting slurry concentration at 35% by mass or more, setting catalytic activity at 30,000 g-PE/g-catalyst (30,000 g of polyethylene per g of the catalyst) or less, and continuously feeding a catalyst at a temperature lower than polymerization temperature by 50° C. or more.

The viscosity change rate of the gel obtained by using the polyethylene powder of the present embodiment can be measured by a method described in Examples described later.

(Intrinsic viscosity (IV) of Polyethylene Powder)

The intrinsic viscosity (IV) of the polyethylene powder of the present embodiment is 1.5 (dL/g) or more and less than 18.0 (dL/g), preferably 2.0 (dL/g) or more and less than 15.0 (dL/g), and more preferably 2.4 (dL/g) or more and less than 7.1 (dL/g). When the intrinsic viscosity (IV) of the polyethylene powder is in the range, both the mechanical strength and fabricability of a shaped body can be achieved in excellent balance.

The intrinsic viscosity (IV) can be measured by a method described in Examples described later.

The intrinsic viscosity (IV) of the polyethylene powder of the present embodiment can be controlled in the numerical value range by using a catalyst described later and appropriately adjusting the polymerization conditions and the like. Examples of specific polymerization conditions include allowing hydrogen to be present in the polymerization system, and/or changing the polymerization temperature. These can control the intrinsic viscosity (IV).

(Viscosity $\eta(266,200)$ of Gel)

When a gel is obtained under <Conditions for Preparing Gel> by using the polyethylene powder of the present embodiment, the viscosity of the gel measured at a shear rate of 266 s$^{-1}$ and a set temperature of 200° C., $\eta(266,200)$, under <Conditions for Measurement of Viscosity Change Rate> is preferably 100 Pas or more and 300 Pas or less, more preferably 120 Pas or more and 250 Pas or less, and further preferably 140 Pas or more and 230 Pas or less.

When the viscosity $\eta(266,200)$ is in the range, the fabricability of a microporous membrane by wet extrusion is good, which is preferable.

The viscosity $\eta(266,200)$ of the gel can be controlled by adjusting the molecular weight of polyethylene, the amount of the copolymer, or the branched structure, adding a lubricant to polyethylene as an additive, or the like.

As for the molecular weight of polyethylene, when the molecular weight is high, the viscosity $\eta(266,200)$ of the gel tends to increase, though it depends on the amount of the copolymer, the branched structure, and the amount of the lubricant. As for the amount of the copolymer, when the amount of the copolymer is increased, the viscosity $\eta(266,200)$ of the gel tends to decrease.

As for the amount of the lubricant, when the amount added is increased, generally, within the range up to about 2000 ppm, the viscosity $\eta(266,200)$ of the gel tends to decrease, though it depends on the type of the lubricant. Even if the amount added is increased over about 2000 ppm, the decrease in the viscosity $\eta(266,200)$ of the gel is small.

The viscosity $\eta(266,200)$ of the gel can be measured by a method described in Examples described later.

($\log(\eta(11,200)/\eta(533,200))$)

A gel is obtained under <Conditions for Preparing Gel> by using the polyethylene powder of the present embodiment. When the viscosity of the gel at a shear rate of 11 s$^{-1}$ and a set temperature of 200° C. and the viscosity of the gel at a shear rate of 533 s$^{-1}$ and a set temperature of 200° C. are measured under <Conditions for Measurement of Viscosity Change Rate>, $\log(\eta(11,200)/\eta(533,200))$ is preferably 1.00 or more and 1.80 or less, more preferably 1.10 or more and 1.60 or less, and further preferably 1.20 or more and 1.50 or less.

$\log(\eta(11,200)/\eta(533,200))$ represents the shear rate dependence of the viscosity of the gel.

In a process for producing a separator for a battery from a gel prepared by using a polyethylene powder, the gel undergoes deformation at a relatively high strain rate in steps of, for example, melting and kneading by an extruder, shaping into a sheet, and stretching the sheet. In the steps, generally, a lower viscosity within a range in which shaping is possible provides high productivity and is therefore preferable. On the other hand, in the steps of carrying out the cooling and conveyance of the sheet, and the like, the sheet preferably does not deform, and therefore in the steps, generally, the viscosity is preferably higher within a range in which shaping is possible.

In view of these circumstances, the numerical value range of $\log(\eta(11,200)/\eta(533,200))$ specifically described above is preferable, since the fabricability and the productivity are good both in steps at a high strain rate and in steps at low strain rate in the production of a separator for a battery by using the polyethylene powder of the present embodiment.

The $\log(\eta(11,200)/\eta(533,200))$ is affected by the weight-average molecular weight, number-average molecular weight, molecular weight distribution, and amount of entanglement of the polyethylene constituting the polyethylene powder of the present embodiment.

When the weight-average molecular weight and the number-average molecular weight increase, $\eta(11,200)$ increases significantly, and therefore $\log(\eta(11,200)/\eta(533,200))$ tends to increase.

When the molecular weight distribution widens, $\eta(11,200)$ tends to decrease due to the effect of the low molecular weight components, and therefore $\log(\eta(11,200)/\eta(533,200))$ also tends to decrease.

When the amount of entanglement of molecules increases, $\eta(11,200)$ tends to increase, and therefore $\log(\eta(11,200)/\eta(533,200))$ also tends to increase.

In other words, specific examples of the method for controlling $\log(\eta(11,200)/\eta(533,200))$ include controlling the molecular weight by the control of the polymerization conditions (temperature, pressure, hydrogen concentration, and the like), controlling the molecular weight distribution by the control of the catalyst preparation conditions (catalyst species, preparation temperature, and preparation time), and controlling the amount of entanglement by the control of the branching of molecules.

The $\log(\eta(11,200)/\eta(533,200))$ can be measured by a method described in Examples described later.

(Isothermal Crystallization Time (min) at 125° C.)

For the polyethylene powder of the present embodiment, the isothermal crystallization time obtained by the following <Isothermal Crystallization Time Measurement> is the time when an exothermic peak top due to crystallization is obtained at 125° C., and preferably less than 7.0 min.

<Isothermal Crystallization Time Measurement>
   step A1: The polyethylene powder is maintained at 50° C. for 1 min, and then the temperature is increased to 180° C. at a temperature increase rate of 10° C./min.
   step A2: The polyethylene powder is maintained at 180° C. for 5 min, and then the temperature is decreased to 125° C. at a temperature decrease rate of 80° C./min.
   step A3: The polyethylene powder is maintained at 125° C. The time when an exothermic peak top due to crystallization is obtained is taken as the isothermal crystallization time (min), provided that the point in time when the temperature reaches 125° C. is regarded as a starting point (0 min).

For the polyethylene powder of the present embodiment, the isothermal crystallization time at 125° C. is preferably less than 7.0 min, more preferably less than 4.0 min, and further preferably less than 3.0 min. When the isothermal crystallization time at 125° C. is less than 7.0 min, the crystal size of a web (a sheet in a state as formed by an extruder) for membrane formation decreases so that a denser pore structure is obtained. The lower limit value of the isothermal crystallization time at 125° C. is not particularly limited, but the isothermal crystallization time at 125° C. is preferably 1.0 min or more.

Examples of the method for controlling the isothermal crystallization time include decreasing the crystal size of polyethylene. Examples of the method for decreasing the crystal size of polyethylene include, but are not limited to, a method involving carrying out the preparation of a polymerization catalyst for polyethylene at low temperature for a long time.

The isothermal crystallization time can be specifically measured by a method described in Examples described later.

[Method for Producing Polyethylene Powder]

Examples of the polymerization method in the method for producing the polyethylene powder of the present embodiment include, but are not limited to, a method including (co)polymerizing ethylene or a monomer including ethylene by a slurry polymerization method, a gas phase polymerization method, a solution polymerization method, or the like.

Among these, the slurry polymerization method, in which polymerization heat can be efficiently removed, is preferable.

In the slurry polymerization method, an inert hydrocarbon medium can be used as a medium, and the olefin itself can also be used as a medium.

Examples of the inert hydrocarbon medium can include, but are not limited to, aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

The polymerization temperature in the method for producing the polyethylene powder of the present embodiment is preferably 80° C. or more and 100° C. or less.

Generally, when the polymerization temperature is 40° C. or more, industrially efficient production tends to be possible; however, the polymerization temperature is 80° C. or more, the coordination of a macromonomer tends to occur easily. On the other hand, when the polymerization temperature is 100° C. or less, continuously stable operation tends to be possible.

The polymerization pressure in the method for producing the polyethylene powder of the present embodiment is preferably 0.10 MPa or more and 2.0 MPa or less, more preferably 0.10 MPa or more and 1.5 MPa or less, and further preferably 0.10 MPa or more and 1.0 MPa or less.

The slurry concentration (the proportion of the solid components in the liquid phase) in the polymerization reactor in the method for producing the polyethylene powder of the present embodiment is preferably 35% by mass or more and 45% by mass or less. When the slurry concentration is 35% by mass or more, the coordination of a macromonomer tends to occur easily. On the other hand, when the slurry concentration is 45% by mass or less, continuously stable operation tends to be possible.

The activity of the catalyst during polymerization in the method for producing the polyethylene powder of the present embodiment is preferably 8,000 g-PE/g-catalyst (8,000 g of polyethylene per g of the catalyst) or more and 30,000 g-PE/g-catalyst (30,000 g of polyethylene per g of the catalyst) or less. When the activity of the catalyst is 8,000 g-PE/g-catalyst or more, the concentration of the residue of the catalyst remaining in the polyethylene powder is sufficiently low, which is preferable. When the activity of the catalyst is 30,000 g-PE/g-catalyst or less, the coordination of a macromonomer tends to occur easily, which is preferable.

The polymerization reaction can be performed by any of batch, semicontinuous, and continuous methods, and particularly, polymerization is preferably performed by a continuous method.

By continuously supplying ethylene gas, a solvent (for example, hexane), catalysts, and others into the polymerization system and continuously discharging the ethylene gas, the solvent, the catalysts, and others together with the produced polyethylene powder, a partial high temperature state due to a sudden reaction of ethylene can be suppressed, and the interior of the polymerization system tends to be more stabilized.

Preferred examples of the catalyst components used for the production of the polyethylene powder of the present embodiment can include Ziegler-Natta catalysts, metallocene catalysts, and Phillips catalysts.

As the Ziegler-Natta catalysts, for example, those described in Japanese Patent No. 5767202 can be preferably used. The metallocene catalysts are not limited to the following, but, for example, those described in Japanese Patent Laid-Open No. 2006-273977 and Japanese Patent No. 4868853 can be preferably used.

A promoter such as triisobutylaluminum or the Tebbe reagent may be contained in the catalyst components used for the production of the polyethylene powder of the present embodiment.

As for the catalyst used for the production of the polyethylene powder of the present embodiment, the active site density is preferably as high as possible. When the active site density is high, a macromonomer tends to be easily produced.

As the method for using the catalyst for the production of the polyethylene powder of the present embodiment, a method is preferably carried out that involves continuously introducing the catalyst into the polymerization reactor in a state in which the catalyst is cooled so that the temperature difference from the polymerization temperature is 50° C. or more and 70° C. or less. When the catalyst is continuously introduced into the polymerization reactor in a state in which the catalyst is cooled so that the temperature difference from the polymerization temperature is 50° C. or more, the coordination of a macromonomer tends to occur easily. When the temperature difference from the polymerization temperature is 70° C. or less, the polymerization reaction can be stably continued.

The average particle diameters of the catalysts used in the method for producing the polyethylene powder of the present embodiment are preferably 0.1 µm or more and 20 µm or less, more preferably 0.2 µm or more and 16 µm or less, and further preferably 0.5 µm or more and 12 µm or less.

When the average particle diameter of the catalyst is 0.1 µm or more, problems such as the scattering of the obtained polyethylene powder and the adhesion of the polyethylene powder to a polymerization reactor, a dryer, and a product hopper tend to be prevented.

When the average particle diameter of the catalyst is 10 µm or less, there is a tendency that too large a polyethylene powder is difficult to produce, which prevents settling of the polyethylene powder in the polymerization system, and there is also a tendency that problems, such as the blockage of a line, in a post-treatment process on polyethylene powder can be avoided.

The particle diameter distributions of the catalysts are preferably as narrow as possible, and fine powder particles and coarse powder particles can be removed by a sieve, centrifugation, or a cyclone.

The method for deactivating the catalysts used for the production of the polyethylene powder is not particularly limited but is preferably carried out after the polyethylene powder is separated from the solvent.

By introducing an agent for deactivating the catalysts after separation from the solvent, the precipitation of the catalyst components and so on dissolved in the solvent can be suppressed, and Ti, Al, Cl, and others derived from the catalyst components can be reduced.

Examples of the agent for deactivating the catalyst systems can include, but are not limited to, oxygen, water, alcohols, glycols, phenols, carbon monoxide, carbon dioxide, ethers, carbonyl compounds, and alkynes.

The weight-average molecular weight and number-average molecular weight of the polyethylene powder of the present embodiment can be controlled by, for example, allowing hydrogen to be present in the polymerization system, or changing the polymerization temperature, as described in the DE No. 3127133A.

By adding hydrogen to the polymerization system as a chain transfer agent, the weight-average molecular weight and number-average molecular weight of the polyethylene powder are easily controlled in a suitable range.

When hydrogen is added to the polymerization system, the mole fraction of hydrogen is preferably 0 mol % or more and 30 mol % or less, more preferably 0 mol % or more and 25 mol % or less, and further preferably 0 mol % or more and 20 mol % or less.

Examples of the solvent separation method in the method for producing the polyethylene powder of the present embodiment include a decantation method, a centrifugation method, and a filter filtration method. In view of the high efficiency of the separation of the polyethylene powder from the solvent, the centrifugation method is preferable.

In the method for producing the polyethylene powder of the present embodiment, a drying step is preferably carried out after the separation of the polyethylene powder from the solvent.

The drying temperature in the drying step is preferably 50° C. or more and 150° C. or less, more preferably 50° C. or more and 140° C. or less, and further preferably 50° C. or more and 130° C. or less. When the drying temperature is 50° C. or more, efficient drying is possible. On the other hand, when the drying temperature is 150° C. or less, drying in a state in which the aggregation and thermal deterioration of the polyethylene powder are suppressed is possible.

(Additives)

The polyethylene powder of the present embodiment can contain, in addition to the components as described above, other known components useful for the production of the polyethylene powder. The polyethylene powder of the present embodiment, for example, may further contain additives such as a neutralizing agent, an antioxidant, and a light stabilizer.

The neutralizing agent is used as a catcher for chlorine contained in polyethylene or a fabrication aid, for example. Examples of the neutralizing agent include, but are not limited to, stearates of alkaline earth metals such as calcium, magnesium, and barium.

The content of the neutralizing agent is not particularly limited but is preferably 5,000 ppm or less, more preferably 4,000 ppm or less, and further preferably 3,000 ppm or less based on the total amount of polyethylene.

When the polyethylene powder of the present embodiment is an ethylene polymer obtained by a slurry polymerization method using a metallocene catalyst, it is also possible to exclude the halogen component from the catalyst constituents. In such a case, the neutralizing agent need not be used.

Examples of the antioxidant include, but are not limited to, phenol-based antioxidants such as dibutylhydroxytoluene, pentaerythrityl-tetrakis[3-(3,5-di-t-butyl-4-hydroxyphenyl) propionate], and octadecyl-3-(3,5-di-t-butyl-4-hydroxyphenyl) propionate.

The content of the antioxidant is not particularly limited but is preferably 5,000 ppm or less, more preferably 4,000 ppm or less, and further preferably 3,000 ppm or less.

Examples of the light stabilizer include, but are not limited to, benzotriazole-based light stabilizers such as 2-(5-methyl-2-hydroxyphenyl)benzotriazole and 2-(3-t-butyl-5-methyl-2-hydroxyphenyl)-5-chlorobenzotriazole; and hindered amine-based light stabilizers such as bis(2,2,6,6-tetramethyl-4-piperidine) sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}].

The content of the light stabilizer is not particularly limited but is preferably 5,000 ppm or less, more preferably 4,000 ppm or less, and further preferably 3,000 ppm or less.

The content of the additives contained in the polyethylene powder of the present embodiment can be obtained by extracting the additives in the polyethylene powder by Soxhlet extraction for 6 hours using tetrahydrofuran (THF), and separating the extract by liquid chromatography for quantification.

[Shaped Body]

The shaped body of the present embodiment is a shaped body of the polyethylene powder of the present embodiment described above.

The polyethylene powder of the present embodiment is characterized in that the temperature dependence of melt viscosity in a gel state is small. Accordingly, the polyethylene powder of the present embodiment is preferred particularly for shaping by wet extrusion.

A gel of the polyethylene powder of the present embodiment can be extruded at high polymer concentration, that is, in a state in which the proportion of polyethylene in the gel is high, even under low temperature conditions during wet extrusion, and therefore defects due to slightly crosslinked products and scorches, and the pressure increase of an extruder can be reduced. Examples of the shaped body formed by wet extrusion include a microporous membrane and a fiber.

(Applications)

The shaped body of the polyethylene powder of the present embodiment is excellent in dimensional stability during heat setting and also undergoes little thermal shrinkage after heat setting, and the shaped body is therefore preferably used for a separator for a battery, specifically a separator for a secondary battery, and particularly a separator for a lithium ion secondary battery and a separator for a lead storage battery.

The polyethylene powder of the present embodiment can be shaped into a solid by, for example, extrusion, press molding, or cutting, and be used for gears, rolls, curtain rails, rails for pachinko balls, liner sheets for storage silos for grain and the like, coatings for imparting the sliding property for rubber products and the like, ski materials and ski soles, and lining materials for heavy machinery such as trucks and shovel loaders.

The polyethylene powder of the present embodiment can also be used for obtaining shaped bodies by sintering the polyethylene powder, and for filters, dust trap materials, and so on.

EXAMPLES

The present embodiment will be described in more detail below by way of specific Examples and Comparative Examples, but the present embodiment is not limited in any way by the following Examples and Comparative Examples.

Methods for measuring various characteristics and physical properties are shown below.

[Methods for Measuring Various Characteristics and Physical Properties]

(1) Intrinsic Viscosity (IV)

The intrinsic viscosity (IV) of each of the polyethylene powders obtained in the Examples and the Comparative Examples described later was measured in accordance with ISO 1628-3 (2010).

First, a solution for measurement was prepared.

The polyethylene powder was weighed within the range of 4.0 to 4.5 mg, and while stirring at 150° C. for 90 min, dissolved in a solvent, specifically, 20 mL of decahydronaphthalene (to which 1 g/L 2,6-di-t-butyl-4-methylphenol was added; hereinafter indicated as decalin) degassed by a vacuum pump and purged with nitrogen in a dissolution tube from which the internal air was removed by a vacuum pump followed by purging with nitrogen, to thereby prepare the polyethylene powder solution for measurement.

As the viscosity tube, a Cannon-Fenske type viscometer (manufactured by SIBATA SCIENTIFIC TECHNOLOGY LTD.: product number-100) was used.

(2) Melt Viscosity ($\eta$) and Viscosity Change Rate (Pas/° C.) of Gel

The melt viscosity ($\eta$) of a gel of each of the polyethylene powders obtained in the Examples and the Comparative Examples described later was measured by the following procedure in accordance with the flow characteristics test using a capillary die prescribed in JIS K7199.

First, 12 g of the polyethylene powder, 28 g of a liquid paraffin (P-350 manufactured by Matsumura Oil Co., Ltd.), and 0.4 g of tetrakis[methylene(3,5-di-t-butyl-4-hydroxyhydrocinnamate)]methane were sufficiently mixed. Then, the mixture was kneaded at a set temperature of 200° C. and a rotation rate of 50 rpm for 10 min using Labo Plastomill (manufactured by Toyo Seiki Seisaku-sho, Ltd., model 4C150, mixer model R-60) to prepare a gel.

The gel was compression-molded according to ASTM D 1928 Procedure C using a mold 1 mm thick to make a gel sheet. The gel sheet made was cut into the form of strips about 5 cm long and 5 mm wide. A capillary die having a capillary diameter of 0.77 mm, a length of 50.80 mm, and an inlet angle of 90° was set in CAPILOGRAPH (manufactured by Toyo Seiki Seisaku-sho, Ltd., model 1D), and the cut gel sheet was introduced. The viscosity was measured.

At the time, the viscosity found at a shear rate of A $s^{-1}$ and a temperature of B° C. was $\eta(A,B)$.

The viscosity change rate (Pas/° C.) was calculated by the following formula (1):

$$\begin{matrix}\text{viscosity} \\ \text{change} \\ \text{rate}\end{matrix} = \frac{\eta(266, 230) - \eta(266, 200)}{30} \qquad (1)$$

(3) Isothermal Crystallization Time (min)

Isothermal crystallization time at 125° C. obtained by the following <Conditions for Measurement of Isothermal Crystallization Time> was measured using a differential scanning calorimeter (DSC).

The measurement was performed according to the following, and the time when an exothermic peak top due to crystallization was obtained was taken as the isothermal crystallization time, provided that the point in time when the temperature reached 125° C. in step A3 is regarded as the starting point (0 min).

<Conditions for Measurement of Isothermal Crystallization Time> step A1: A polyethylene powder was maintained at 50° C. for 1 min, and then the temperature was increased to 180° C. at a temperature increase rate of 10° C./min.

step A2: The polyethylene powder was maintained at 180° C. for 30 min, and then the temperature was decreased to 125° C. at a temperature decrease rate of 80° C./min.

step A3: The polyethylene powder was maintained at 125° C.

(4) Making of Microporous Membrane

Disassembly and cleaning were previously carried out on a twin-screw extruder.

A polyethylene powder and a liquid paraffin were uniformly melted and kneaded by the twin-screw extruder to obtain a melted and kneaded material of polyethylene (gel).

The proportion of the polyethylene powder in the gel was adjusted as follows.

When the intrinsic viscosity (IV) of the polyethylene powder was less than 3.9 dL/g, the proportion of the polyethylene powder in the gel was 40% by mass.

When the intrinsic viscosity (IV) of the polyethylene powder was 3.9 dL/g or more and less than 6.1 dL/g, the proportion of the polyethylene powder in the gel was 30% by mass.

When the intrinsic viscosity (IV) of the polyethylene powder was 6.1 dL/g or more and less than 7.1 dL/g, the proportion of the polyethylene powder in the gel was 27% by mass.

When the intrinsic viscosity (IV) of the polyethylene powder was 7.1 dL/g or more, the proportion of the polyethylene powder in the gel was 24% by mass.

The extrusion temperature was set at temperature T (° C.) within the range of 170° C. to 220° C. such that the viscosity at a shear rate of 266 s$^{-1}$ and set temperature T (° C.), η(266,T), was closest to 200 Pas, and extrusion was carried out at a screw rotation rate of 170 rpm and an amount discharged of 15 kg/hr. Screen mesh with 100 mesh was used.

Then, the melted and kneaded material was extruded into the form of a sheet using a T-die (250 mm wide) maintained at 220° C. The melted and kneaded material was pressure-bonded and cooled by a metal roll controlled at a surface temperature of 60° C. to obtain a 1000 μm thick gel sheet excellent in thickness stability. For the evaluation of the pressure increase of the extruder, which will be described later, the extrusion was continuously carried out for 8 hr.

Next, the gel sheet was stretched in a ratio of 7×7 at a stretching temperature of 125° C. using a simultaneous biaxial stretching machine, then guided to a methyl ethyl ketone bath, and sufficiently immersed in methyl ethyl ketone to extract and remove the liquid paraffin. Then, the methyl ethyl ketone was dried and removed.

Then, the sheet was stretched in a ratio of 1.5 in the transverse direction at 120° C. by a tenter stretching machine and heat-set at 125° C.

Further, the microporous membrane was wound around a paper tube by a winding machine.

(5) Evaluation of Membrane Defects

The number of defects having a diameter of 0.2 mm or more present in an area of 25 cm×25 cm of the obtained microporous membrane was visually determined. The criteria of evaluation were as follows.

0/625 cm$^2$ or more and less than 4/625 cm$^2$: ○
4/625 cm$^2$ or more and less than 7/625 cm$^2$: Δ
7/625 cm$^2$ or more: X (6) Evaluation of Pressure Increase of Extruder In (4) Making of Microporous Membrane, pressure was measured by a resin pressure gauge attached upstream of the breaker plate. The difference between the average value of resin pressure for 10 min after the start of extrusion and the average value of resin pressure for 10 min before the completion of extrusion was used as the pressure increase to be evaluated. The criteria of evaluation were as follows.

0 MPa or more and less than 0.5 MPa: ○
0.5 MPa or more and less than 1.0 MPa: Δ
1.0 MPa or more: X (7) Evaluation of Slack The microporous membrane made in (4) was pulled out by about 3 m and horizontally spread in the air with the four corners held, and partial slack was visually checked. Evaluation was performed in terms of what extent the partial slack worsened after the microporous membrane was allowed to stand in the state of a roll at normal temperature for 1 week, compared with immediately after membrane formation. The criteria of evaluation were as follows.

A microporous membrane in which there is no change in the amount of slack: ○

A microporous membrane in which the amount of slack increases slightly: Δ

A microporous membrane in which the amount of slack increases clearly: X (8) Evaluation of Thermal Shrinkage The microporous membrane made in (4) was cut into a 10 cm×10 cm square along the MD and TD directions, and the cut piece was placed in a paper envelope in order to avoid contact with a metal and hot air, and allowed to stand in an oven at 105° C. for 1 hr. Then, the microporous membrane was cooled at room temperature, and the length L (cm) in the TD direction was measured. The thermal shrinkage rate was calculated by the following formula:

Thermal shrinkage rate in TD direction (%)=(10−L)/10×100

The criteria of evaluation were as follows.
0% or more and less than 4%: ○
4% or more and less than 6%: Δ
6% or more: X

[Production Example] Synthesis of Catalyst
(Synthesis of Solid Catalyst Component [A-1])

<(1) Preparation of Starting Material (a-1)>

In an 8 L stainless steel autoclave sufficiently purged with nitrogen, 2,000 mL of a 1 mol/L $Mg_6(C_4H_9)_{12}AL(C_2H_5)_3$ solution in hexane (corresponding to 2000 mmol of magnesium and aluminum) was placed, and 146 mL of a 5.47 mol/L n-butanol solution in hexane was dropped over 3 hr with stirring at 50° C. After completion, the production line was washed with 300 mL of hexane.

Further, the stirring was continued at 50° C. over 2 hr. The material cooled to normal temperature after the completion of the reaction was designated as the starting material (a-1). The starting material (a-1) had a magnesium concentration of 0.715 mol/L.

<(2) Preparation of Starting Material (a-2)>

In an 8 L stainless steel autoclave sufficiently purged with nitrogen, 2,000 mL of a 1 mol/L $Mg_6(C_4H_9)_{12}AL(C_2H_5)_3$ solution in hexane (corresponding to 2000 mmol of magnesium and aluminum) was placed, and 240 mL of an 8.41 mol/L methylhydrogenpolysiloxane (manufactured by Shin-Etsu Chemical Co., Ltd.) solution in hexane was pressure-fed with stirring at 80° C. Further, the stirring was continued at 80° C. over 2 hr to perform the reaction. The material cooled to normal temperature after the completion of the reaction was designated as a starting material (a-2). The starting material (a-2) had a total concentration of magnesium and aluminum of 0.791 mol/L.

<(3) Preparation of (A-1) Support>

In an 8 L stainless steel autoclave sufficiently purged with nitrogen, 1,000 mL of a 1 mol/L hydroxytrichlorosilane solution in hexane was placed, and 1340 mL of a solution of the organomagnesium compound of the starting material (a-1) (corresponding to 943 mmol of magnesium) in hexane was dropped over 3 hr at 65° C. Further, the reaction was continued at 65° C. for 1 hr with stirring. After the completion of the reaction, the supernatant liquid was removed, followed by washing the residue four times with 1,800 mL of hexane to obtain a support (A-1). This support (A-1) was analyzed, and as a result, the amount of magnesium contained was 7.5 mmol per gram of the solid.

<(4) Synthesis of Solid Catalyst Component [A-1]>

825 mL of a 1 mol/L titanium tetrachloride solution in hexane and 1050 mL of the starting material (a-2) were simultaneously added to 1,970 mL of a slurry containing 110 g of the support (A-1) in hexane over 3 hr with stirring at 10° C. After the addition, the reaction was continued at 10° C. for 1 hr. After the completion of the reaction, the supernatant liquid was removed, followed by washing the residue four times with hexane to remove the unreacted starting material components to synthesize a solid catalyst component [A-1].

(Synthesis of Solid Catalyst Component [A-2])

A solid catalyst component [A-2] was synthesized in the same manner as of the synthesis of the solid catalyst component [A-1] except the following: the amounts of the titanium tetrachloride solution in hexane and the starting material (a-2) added to the slurry containing the support (A-1) in hexane were 103 mL and 131 mL, respectively.

(Synthesis of Solid Catalyst Component [B])

(1) Synthesis of Starting Material (b-1)

In an 8 L stainless steel autoclave sufficiently purged with nitrogen, 2,000 mL of a 1 mol/L $Mg_6(C_4H_9)_{12}AL(C_2H_5)_3$ solution in hexane (corresponding to 2000 mmol of magnesium and aluminum) was placed, and 240 mL of an 8.33 mol/L methylhydrogenpolysiloxane (manufactured by Shin-Etsu Chemical Co., Ltd.) solution in hexane was pressure-fed with stirring at 80° C. Further, the stirring was continued at 80° C. over 2 hr to perform the reaction. The material cooled to normal temperature after the completion of the reaction was designated as a starting material (b-1). The starting material (b-1) had a total concentration of magnesium and aluminum of 0.786 mol/L.

(2) Preparation of Solid Catalyst Component [B]

1,600 mL of hexane was added to an 8 L stainless steel autoclave purged with nitrogen. 800 mL of a 1 mol/L titanium tetrachloride solution in hexane and 800 mL of the starting material (b-1) were simultaneously added over 5 hr with stirring at 10° C. The reaction was continued at 10° C. for 1 hr. After the completion of the reaction, the supernatant liquid was removed, followed by washing the residue four times with hexane to remove the unreacted starting material components to prepare a solid catalyst component [B].

Example 1

(Method for Producing Ethylene Polymer)

Hexane, ethylene, hydrogen, and a catalyst were continuously supplied to a vessel type 300 L polymerization reactor equipped with a stirring apparatus under the condition of an average residence time of 2 hr. The polymerization pressure was 0.5 MPa. The polymerization temperature was kept at 83° C. by jacket cooling. The catalyst cooled to 4° C. was continuously supplied.

As the catalyst, the solid catalyst component [A-1] and triisobutylaluminum as a promoter were used. Triisobutylaluminum was added to the polymerization reactor at a rate of 10 mmol/hr. The solid catalyst component [A-1] was supplied so that the polymerization rate (production rate) of the ethylene polymer was 10 kg/hr, and the slurry concentration in the polymerization reactor was 38% by mass.

Hydrogen was continuously supplied by a pump so that the gas phase concentration was 1.8 mol %.

The obtained polymer slurry was fed to a centrifuge, and the polymer (polyethylene) was separated from the solvent and the others than the polymer (polyethylene) to obtain the ethylene polymer. The separated ethylene polymer was dried with nitrogen blowing at 70° C. The ethylene polymer thus obtained was passed through a sieve having an opening of 425 μm, and the ethylene polymer not passing through the sieve was removed to obtain a polyethylene powder. The catalytic activity was 13970 g-PE/g-catalyst (13970 g of the polyethylene powder per g of the catalyst).

The characteristics of the obtained polyethylene powder were measured by the methods described above. The measurement results are shown in the following Table 1.

Example 2

A polyethylene powder was obtained by the same operation as in [Example 1] except the following: in the polymerization step, the gas phase hydrogen concentration was 9.1 mol %, and the catalyst was introduced so that the slurry concentration was 20% by mass. The catalytic activity was 18372 g-PE/g-catalyst. The characteristics of the obtained polyethylene powder are shown in the following Table 1.

Example 3

A polyethylene powder was obtained by the same operation as in [Example 1] except the following: in the polymerization step, the polymerization temperature was 70° C., the gas phase hydrogen concentration was 9.4 mol %, and 1-butene as a copolymerizable component was continuously introduced so that the gas phase concentration was 0.15 mol %. The catalytic activity was 11989 g-PE/g-catalyst. The characteristics of the obtained polyethylene powder are shown in the following Table 1.

Example 4

A polyethylene powder was obtained by the same operation as in [Example 1] except the following: in the polymerization step, [A-2] was used as the solid catalyst component, and the catalyst was introduced so that the slurry concentration was 35% by mass. The catalytic activity was 19598 g-PE/g-catalyst. The characteristics of the obtained polyethylene powder are shown in the following Table 1.

Example 5

A polyethylene powder was obtained by the same operation as in [Example 1] except the following: in the polymerization step, the gas phase hydrogen concentration was 0.4 mol %. The catalytic activity was 35184 g-PE/g-catalyst. The characteristics of the obtained polyethylene powder are shown in the following Table 1.

Example 6

A polyethylene powder was obtained by the same operation as in [Example 1] except the following: in the polymerization step, the gas phase hydrogen concentration was 15.1 mol %, the catalyst was introduced so that the slurry concentration was 40% by mass, and the catalyst kept at 60° C. was intermittently supplied. The catalytic activity was 10201 g-PE/g-catalyst. The characteristics of the obtained polyethylene powder are shown in the following Table 1.

Example 7

A polyethylene powder was obtained by the same operation as in [Example 1] except the following: in the polymerization step, the polymerization temperature was 70° C., the gas phase hydrogen concentration was 0.03 mol %, and the catalyst was introduced so that the slurry concentration was 36% by mass. The catalytic activity was 45839 g-PE/g-catalyst. The characteristics of the obtained polyethylene powder are shown in the following Table 1.

Comparative Example 1

A polyethylene powder was obtained by the same operation as in [Example 1] except the following: in the polymerization step, the gas phase hydrogen concentration was 7.8 mol %, 1-butene as a copolymerizable component was continuously introduced so that the gas phase concentration was 0.15 mol %, [B] was used as the solid catalyst component, the temperature of the catalyst during introduction was 60° C., and the introduced amount of the catalyst was set so that the slurry concentration was 31% by mass. The catalytic activity was 20411 g-PE/g-catalyst. The characteristics of the obtained polyethylene powder are shown in the following Table 1.

Comparative Example 2

A polyethylene powder was obtained by the same operation as in [Example 1] except the following: in the polymerization step, the polymerization temperature was 70° C., the gas phase hydrogen concentration was 0.01 mol %, the catalyst was introduced so that the slurry concentration was 25% by mass, and the temperature of the catalyst during introduction was 60° C. The catalytic activity was 45022 g-PE/g-catalyst. Since this polyethylene powder had high intrinsic viscosity (IV), the polyethylene powder was impossible to suitably shape into a membrane, and evaluation was thus impossible. The characteristics of the obtained polyethylene powder are shown in the following Table 1.

Comparative Example 3

A polyethylene powder was obtained by the same operation as in [Example 1] except the following: in the polymerization step, the polymerization temperature was 70° C., the gas phase hydrogen concentration was 18.5 mol %, 1-butene as a copolymerizable component was continuously introduced so that the gas phase concentration was 0.8 mol %, [A-2] was used as the solid catalyst component, and the catalyst was introduced so that the slurry concentration was 25% by mass. The catalytic activity was 8423 g-PE/g-catalyst. The characteristics of the obtained polyethylene powder are shown in the following Table 1.

TABLE 1

| | Unit | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Intrinsic viscosity (IV) | dL/g | 6.6 | 4.4 | 4.2 | 6.7 | 8.9 | 2.4 | 13 | 4.5 | 18.5 | 1.9 |
| Melt viscosity change rate | Pas/° C. | −0.11 | −0.09 | −0.41 | −0.42 | −0.66 | −0.44 | −0.46 | −0.83 | −0.41 | −0.82 |
| η(266,200) | Pas | 220 | 196 | 158 | 213 | 245 | 121 | 270 | 183 | 325 | 61 |
| log(η(11,200)/η(533,200)) | — | 1.30 | 1.18 | 1.12 | 1.30 | 1.44 | 1.15 | 1.62 | 1.19 | 1.61 | 1.11 |
| Isothermal crystallization time | min | 1.5 | 2.4 | 6.7 | 2.8 | 3.7 | 2.8 | 3.4 | 1.4 | 1.1 | 25 |
| Extrusion temperature | ° C. | 180 | 177 | 181 | 185 | 187 | 175 | 230 | 221 | 230 | 213 |
| Membrane defects | Number/625 cm² | ○ | ○ | Δ | ○ | Δ | ○ | Δ | X | — | X |
| Pressure increase of extruder | MPa | ○ | Δ | ○ | Δ | Δ | ○ | Δ | X | — | ○ |
| Slack | — | ○ | ○ | Δ | ○ | ○ | ○ | Δ | X | — | X |
| Thermal shrinkage | % | ○ | ○ | Δ | ○ | Δ | Δ | Δ | X | — | X |

In the Examples, polyethylene powders were obtained that provided few membrane defects, small pressure increase of the extruder, small thermal shrinkage, and reduced slack over time.

This application is based upon the prior Japanese Patent Application No. 2020-094628 filed to the Japan Patent Office on May 29, 2020, the contents of which are incorporated herein by reference.

INDUSTRIAL APPLICABILITY

The polyethylene powder of the present invention has industrial applicability as a material for various shaped bodies, a microporous membrane, a separator for a battery, and a fiber.

The invention claimed is:

1. A polyethylene powder satisfying the following Requirement 1 and Requirement 2:
   Requirement 1): a viscosity change rate of a gel obtained by the following <Conditions for Preparing Gel> is −0.8 Pas/° C. or more and 0.0 Pas/° C. or less under the following <Conditions for Measurement of Viscosity Change Rate>:
   <Conditions for Preparing Gel>
      28 g of a liquid paraffin having an average molecular weight of 450 g/mol or more and less than 550 g/mol, 12 g of the polyethylene powder, and 0.4 g of tetrakis[methylene(3,5-di-t-butyl-4-hydroxy-hydrocinnamate)]methane are kneaded at a set temperature of 200° C. and a rotation rate of 50 rpm for 10 min using a torque rheometer to obtain a gel;
   <Conditions for Measurement of Viscosity Change Rate>
      viscosity (Pas) is measured at a piston rate of 10 mm/min (a shear rate of 266 s$^{-1}$) at set temperatures of 200° C. and 230° C. in accordance with a flow characteristics test using a capillary die prescribed in JIS K7199, using a capillary die having a capillary diameter of 0.77 mm, a length of 50.80 mm, and an inlet angle of 90°, and a viscosity change rate (Pas/° C.) is obtained by the following formula (1):

$$\text{viscosity change rate} = \frac{\eta(266, 230) - \eta(266, 200)}{30} \quad (1)$$

wherein η(A,B) represents a viscosity found under conditions of a shear rate of A s$^{-1}$ and a temperature of B° C.;
   Requirement 2: intrinsic viscosity (IV) is 1.5 dL/g or more and less than 18.0 dL/g.

2. The polyethylene powder according to claim 1, wherein a viscosity of the gel at a shear rate of 266 s$^{-1}$ and a set temperature of 200° C., η(266,200), is 100 Pas or more and 300 Pas or less.

3. The polyethylene powder according to claim 2, wherein when a viscosity of the gel at a shear rate of 11 s$^{-1}$ and a set temperature of 200° C. and a viscosity of the gel at a shear rate of 533 s$^{-1}$ and a set temperature of 200° C. are measured under the <Conditions for Measurement of Viscosity Change Rate> for the gel obtained by the <Conditions for Preparing Gel>,
   log(η(11,200)/η(533,200)) is 1.00 or more and 1.80 or less.

4. The polyethylene powder according to claim 3, wherein the polyethylene powder is an ethylene homopolymer.

5. The polyethylene powder according to claim 4, wherein isothermal crystallization time at 125° C. obtained by the following <Conditions for Measurement of Isothermal Crystallization Time> is less than 7.0 min,
   <Conditions for Measurement of Isothermal Crystallization Time>
      step A1: the polyethylene powder is maintained at 50° C. for 1 min, and then temperature is increased to 180° C. at a temperature increase rate of 10° C./min
      step A2: the polyethylene powder is maintained at 180° C. for 5 min, and then the temperature is decreased to 125° C. at a temperature decrease rate of 80° C./min
      step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

6. The polyethylene powder according to claim 3, wherein isothermal crystallization time at 125° C. obtained by the following <Conditions for Measurement of Isothermal Crystallization Time> is less than 7.0 min,
   <Conditions for Measurement of Isothermal Crystallization Time>
      step A1: the polyethylene powder is maintained at 50° C. for 1 min, and then temperature is increased to 180° C. at a temperature increase rate of 10° C./min
      step A2: the polyethylene powder is maintained at 180° C. for 5 min, and then the temperature is decreased to 125° C. at a temperature decrease rate of 80° C./min
      step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

7. The polyethylene powder according to claim 2, wherein the polyethylene powder is an ethylene homopolymer.

8. The polyethylene powder according to claim 7, wherein isothermal crystallization time at 125° C. obtained by the following <Conditions for Measurement of Isothermal Crystallization Time> is less than 7.0 min,
   <Conditions for Measurement of Isothermal Crystallization Time>
      step A1: the polyethylene powder is maintained at 50° C. for 1 min, and then temperature is increased to 180° C. at a temperature increase rate of 10° C./min
      step A2: the polyethylene powder is maintained at 180° C. for 5 min, and then the temperature is decreased to 125° C. at a temperature decrease rate of 80° C./min
      step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

9. The polyethylene powder according to claim 2, wherein isothermal crystallization time at 125° C. obtained by the following <Conditions for Measurement of Isothermal Crystallization Time> is less than 7.0 min,
   <Conditions for Measurement of Isothermal Crystallization Time>
      step A1: the polyethylene powder is maintained at 50° C. for 1 min, and then temperature is increased to 180° C. at a temperature increase rate of 10° C./min
      step A2: the polyethylene powder is maintained at 180° C. for 5 min, and then the temperature is decreased to 125° C. at a temperature decrease rate of 80° C./min
      step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

10. A shaped body of the polyethylene powder according to claim 2.

11. The polyethylene powder according to claim 1, wherein when a viscosity of the gel at a shear rate of 11 s$^{-1}$ and a set temperature of 200° C. and a viscosity of the gel at a shear rate of 533 s$^{-1}$ and a set temperature of 200° C. are measured under the <Conditions for Measurement of Viscosity Change Rate> for the gel obtained by the <Conditions for Preparing Gel>, log($\eta$(11,200)/$\eta$(533,200)) is 1.00 or more and 1.80 or less.

12. The polyethylene powder according to claim 11, wherein the polyethylene powder is an ethylene homopolymer.

13. The polyethylene powder according to claim 12, wherein isothermal crystallization time at 125° C. obtained by the following <Conditions for Measurement of Isothermal Crystallization Time> is less than 7.0 min, <Conditions for Measurement of Isothermal Crystallization Time> step A1: the polyethylene powder is maintained at 50° C. for 1 min, and then temperature is increased to 180° C. at a temperature increase rate of 10° C./min step A2: the polyethylene powder is maintained at 180° C. for 5 min, and then the temperature is decreased to 125° C. at a temperature decrease rate of 80° C./min step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

14. The polyethylene powder according to claim 11, wherein isothermal crystallization time at 125° C. obtained by the following <Conditions for Measurement of Isothermal Crystallization Time> is less than 7.0 min, <Conditions for Measurement of Isothermal Crystallization Time> step A1: the polyethylene powder is maintained at 50° C. for 1 min, and then temperature is increased to 180° C. at a temperature increase rate of 10° C./min step A2: the polyethylene powder is maintained at 180° C. for 5 min, and then the temperature is decreased to 125° C. at a temperature decrease rate of 80° C./min step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

15. The polyethylene powder according to claim 1 wherein the polyethylene powder is an ethylene homopolymer.

16. The polyethylene powder according to claim 15, wherein isothermal crystallization time at 125° C. obtained by the following <Conditions for Measurement of Isothermal Crystallization Time> is less than 7.0 min, <Conditions for Measurement of Isothermal Crystallization Time> step A1: the polyethylene powder is maintained at 50° C. for 1 min, and then temperature is increased to 180° C. at a temperature increase rate of 10° C./min step A2: the polyethylene powder is maintained at 180° C. for 5 min, and then the temperature is decreased to 125° C. at a temperature decrease rate of 80° C./min step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

17. The polyethylene powder according to claim 1 wherein isothermal crystallization time at 125° C. obtained by the following <Conditions for Measurement of Isothermal Crystallization Time> is less than 7.0 min, <Conditions for Measurement of Isothermal Crystallization Time> step A1: the polyethylene powder is maintained at 50° C. for 1 min, and then temperature is increased to 180° C. at a temperature increase rate of 10° C./min step A2: the polyethylene powder is maintained at 180° C. for 5 min, and then the temperature is decreased to 125° C. at a temperature decrease rate of 80° C./min step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 minutes.

18. A shaped body of the polyethylene powder according to claim 1.

19. The shaped body according to claim 18, wherein the shaped body is a separator for a battery.

20. The shaped body according to claim 18, wherein the shaped body is a separator for a lithium ion secondary battery.

* * * * *